Figure 1:
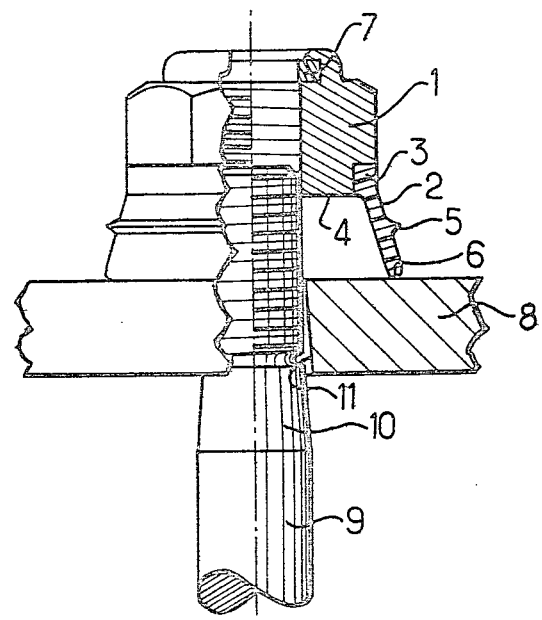

United States Patent [19]

Layeillon

[11] 4,230,166
[45] Oct. 28, 1980

[54] SKIRTED NUT

[75] Inventor: Jacques Layeillon, Paris, France

[73] Assignee: Simmonds, S.A., France

[21] Appl. No.: 953,578

[22] Filed: Oct. 23, 1978

[30] Foreign Application Priority Data

Dec. 14, 1977 [FR] France .................. 77 37693

[51] Int. Cl.² .................. F16B 39/26; F16B 39/34
[52] U.S. Cl. .................. 151/7; 151/38
[58] Field of Search .................. 151/7, 38, 21 R; 85/32 R, 1 JP

[56] References Cited

U.S. PATENT DOCUMENTS 3,325,196  6/1967  Noirot .................. 151/7 X

FOREIGN PATENT DOCUMENTS 83732   8/1964  France .................. 151/38
2312683 12/1976 France .................. 85/1 JP Primary Examiner—Ramon S. Britts
Attorney, Agent, or Firm—Steinberg & Blake

[57] ABSTRACT

This invention relates to a nut including a resilient skirt portion generally frusto-conical in shape the wall of which comprises an external circular rib preventing the skirt portion from turning up after a member is fastened against a threaded element by the nut.

3 Claims, 2 Drawing Figures

SKIRTED NUT

The present invention has essentially for its object improvements in nuts provided with a skirt, referred to as skirted nuts.

There are already known nuts provided with a resilient skirt or collar of an appropriate synthetic material, generally frusto-conical in shape, the smaller base of which is secured to the bearing-face side of the nut.

Such nuts are described for example in the U.S. Pat. No. 3,325,196 of June 13, 1967 in the name of the Applicant Company.

Such nuts are particularly useful where a fixed member or part is to be fastened on or against an initially movable threaded element, for the said screws prevent the threaded element from rotating with the nut, as the latter is tightened, as a result of friction between the threads of the nut and those of the threaded element, or where use is made of so called self-locking nuts provided with an unthreaded ring engaging the screw threads.

The applicant has observed, however, that those prior nuts suffered from a certain number of drawbacks due to the fact that, after the threaded element is fastened on the said member or part, the nut skirt turns up.

This results in the nut not being re-usable since the skirt cannot be made to re-assume its initial frusto-conical shape.

Moreover, in the case of flat or small-height nuts, the skirt portion having turned up like a corolla completely covers the nut, so that access to the latter by means of a spanner or wrench becomes impossible.

The purpose of the present invention is essentially to reliably prevent the nut skirt portion from turning up after the nut is tightened, and the invention provides to this end an improved skirted nut essentially characterized in that the nut skirt wall, which is of constant thickness throughout its entire height, comprises an external circular rib cast integral with the said skirt portion.

It is understood that such an annular rib or portion of increased thickness strengthens the skirt portion and reliably prevents the latter from turning up after the nut is tightened, whatever the type of assembly to be obtained.

According to another characterizing feature of the invention, the said circular rib extends at substantially the middle of the height of the skirt portion, i.e. at the level of the weak region of the skirt portion, which in the skirted nuts of the prior art, caused the turning up of the skirt portion.

According to a still another characterizing feature of the invention, the said rib is of substantially triangular cross-section.

It should also be noted that an improved skirted nut according to the invention may comprise a self-locking means such as for example a ring accommodated in the nut body, a constriction of the threaded portion or any other self-locking means known per se.

The invention is also directed at an assembly of members or parts using a skirted nut offering the aforementioned characterizing feature.

Figure 2:
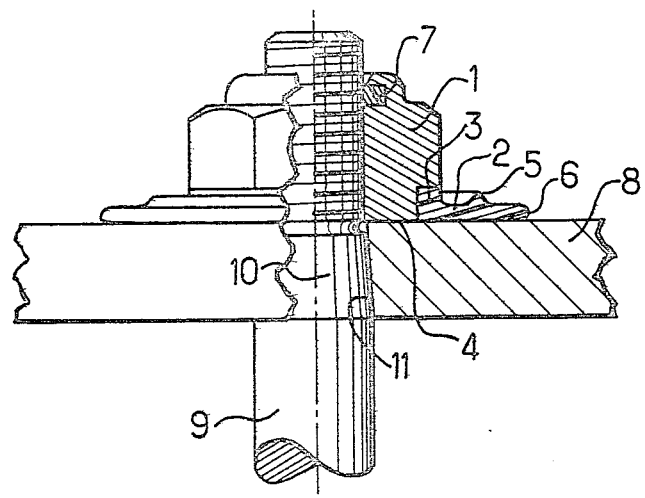

Other purposes and advantages of the invention will appear more clearly from the following detailed description made with reference to the appended drawings given solely by way of example and wherein:

FIG. 1 is a partial elevational (left portion of the Figure) and partial sectional (right portion of the Figure) view of a skirted nut according to the invention, before the fastening of the members to be assembled; and FIG. 2 is a view identical with that of FIG. 1, but showing the nut in tightened or fastened position.

According to one example of embodiment, a skirted nut 1 according to the invention comprises a resilient skirt portion or collar portion 2 generally frusto-conical in shape, the smaller base 3 of which is mounted round the nut, as seen clearly in the Figures, on the bearing-face 4 side of the nut.

As known per se, the skirt portion 2 may be of a suitable synthetic material such as polyamide, and the smaller base 3 of the skirt portion is mounted round the nut in any appropriate manner, e.g. by being set on to it or fitted into an annular undercut groove as appears in the Figures.

According to the invention, the wall of the skirt portion 2 is of constant thickness throughout its entire height, except for an external circular rib 5 cast integral with the said skirt portion and extending substantially at the middle of its height as clearly seen in the Figures.

According to a preferred form of embodiment, the rib 5 is of substantially triangular cross-section.

The annular edge 6 of the skirt portion 2 is rounded to allow the skirt portion to open out or expand as the nut 1 is screwed on and tightened, as will be explained in more detail later.

At 7 is shown a ring of synthetic material which, as known per se, ensures the self-locking of the nut 1 as the latter is screwed on.

The nut just described advantageously allows a fixed member or portion 8 to be fastened against a threaded element 9 which may be for example a ball-joint tail or the like comprising a taper portion 10 intended to be fitted into a bore 11 of a correspondingly tapering shape provided in the member 8 which, in the example of embodiment illustrated, presents two flat surfaces. It is to be understood, however, that the member 8 may be of any suitable shape.

The manner in which the above-described skirted nut is used will be explained hereafter briefly, since its use has already been described in the applicant's prior patent mentioned at the beginning of the present description.

The nut 1 is engaged onto the first threads of the threaded portion of element 9, as seen clearly in FIG. 1. As the nut 1 is screwed on, the skirt portion 2 becomes deformed by opening out as its larger base 6 slides on the surface of the member 8. During this process the skirt portion develops a resilient reaction tending to move the nut 1 from the said surface and therefore to move the taper portion 10 of the element 9 towards the corresponding taper bore 11 of the member 8. Thus, the friction between the taper surfaces 10 and 11 prevents the threaded element 9 from rotating together with the nut, especially when the threads of element 9 engage the self-locking ring 7.

The nut 1 can thus be efficiently tightened until it reaches the fastening position shown in FIG. 2 where the skirt portion 2 is seen applied on the surface of the element 8.

In accordance with the present invention, the skirt portion 2 will always remain in the position shown in FIG. 2 whatever the nature and shape of the member 8. In other words, there is no risk that the skirt portion 2 might turn up and cover the nut, since it will be prevented from doing so by the annular rib 5.

Of course the rib 5 may be given a different cross-sectional shape from the triangular one illustrated in the Figures, provided that said different shape results in providing a region of sufficiently increased thickness capable of preventing the skirt portion from turning up.

The invention is therefore by no means limited to the forms of the embodiment described and illustrated, which have been given by way of example only. In particular, it comprises all means constituting technical equivalents to the means described as well as their combinations should the latter be carried out according to its gist and used within the scope of the following claims.

What is claimed is:

1. In a skirted nut comprising a nut portion having a bearing face adapted to be applied onto the face of a member or part and a resilient skirt portion, the latter being substantially frusto-conical in shape and having a smaller base end region secured to the bearing face side of the nut portion and a larger base end region adapted to be applied onto the face of the member or part onto which the bearing face of the nut portion is adapted to be applied, the improvement comprising said skirt portion being formed by a wall having a substantially constant thickness throughout its height and including a rib integrally formed on the external surface of said skirt portion wall circularly extending around the entire periphery of said frusto-conical skirt portion at substantially the mid-portion of the height thereof, so as to be substantially within a plane which is perpendicular to the center axis of the frusto-conical skirt portion, said rib being substantially triangular in cross-section, whereby said skirt portion is prevented from turning upwardly and assuming a upwardly turned configuration during the threading of said nut portion as the bearing face of the nut portion moves toward the face of the member or part.

2. A nut according to claim 1, which further includes a bore including a self-locking means.

3. A nut according to claim 2, wherein said self-locking means includes a ring accommodated within the nut body.

* * * * *